United States Patent
Schreiber

Patent Number: 5,485,383
Date of Patent: Jan. 16, 1996

[54] ATTITUDE AND ORBIT CONTROL SYSTEM (AOCS) COMPRISING A TESTING SYSTEM

[75] Inventor: Wolfgang Schreiber, Arget, Germany

[73] Assignee: Deutsche Aerospace AG, Germany

[21] Appl. No.: 29,278

[22] Filed: Mar. 12, 1993

[30] Foreign Application Priority Data

Mar. 12, 1992 [DE] Germany .......................... 42 07 826.1

[51] Int. Cl.⁶ ...................................................... B64G 1/24
[52] U.S. Cl. .......................................... 364/434; 364/459
[58] Field of Search ...................................... 364/131, 132, 364/434, 459, 424.06, 424.02, 424.01

[56] References Cited

U.S. PATENT DOCUMENTS

| | | | |
|---|---|---|---|
| 4,626,996 | 12/1986 | Arlott | 364/424.06 |
| 4,700,292 | 10/1987 | Campanini | 364/200 |
| 4,787,041 | 11/1988 | Yount | 364/424.03 |
| 4,803,613 | 2/1989 | Kametani et al. | 364/132 |
| 4,918,589 | 4/1990 | Floro et al. | 364/132 |
| 4,933,862 | 6/1990 | Wataya | 364/431.06 |
| 5,121,382 | 6/1992 | Yang et al. | 370/31 |
| 5,140,525 | 8/1992 | Shankar et al. | 364/459 |
| 5,276,896 | 1/1994 | Rimmer et al. | 364/132 |

Primary Examiner—Kevin J. Teska
Assistant Examiner—Stephen J. Walder, Jr.
Attorney, Agent, or Firm—Evenson, McKeown, Edwards & Lenahan

[57] ABSTRACT

This invention relates to an attitude and orbit control system in which a standard interface is provided between an attitude and orbit control electronics unit and all peripheral systems. For this purpose microprocessors with expandable processing capability are used, and processing power is decentralized, with data processing being performed on the periphery. All functions such as automatic controllers, modulators, etc. are implemented with expandable microprocessors.

15 Claims, 6 Drawing Sheets

ATTITUDE AND ORBIT CONTROL SYSTEM (AOCS) COMPRISING A TESTING SYSTEM

BACKGROUND AND SUMMARY OF THE INVENTION

This invention relates to a spacecraft Attitude and Orbit Control System (AOCS or AOC System) in which peripheral systems such a sun sensors, earth sensors, gyros, jet controls, spin wheels and the like are controlled by an attitude and orbit control electronics unit.

Many types of AOC-systems are known; however, each of the known systems was conceived for an individual application, and is composed of known and commercially available electronic, mechanical and optical modules, etc. Thus, a large number of different types of utility interfaces is required for use with such systems. Moveover, such prior art systems require extensive hardware interfaces, which leads to a significant increase of weight and costs, a decrease of the overall reliability and high power losses.

The known Modular Attitude and Orbit Control System (MACOS) attempts to control external interface problems by using buses, but each of the used processor buses has a limited communication bandwidth, and as a result reduces its real-time capacity as the number of intelligent users rises.

The Attitude and Orbit Control System which is currently used at EUTELSAT, has an AOCE (Attitude and Orbit Control Electronics unit) which is controlled by a microprocessor, while the peripherals usually have no microprocessors. Moreover, the interfaces between the utilities are not standardized (there being 45 different types). Such systems require elaborate hardware interfaces for all utilities (for example, sun sensors, earth sensors, gyro systems, jet controls, spin wheels, telecommand/telemetry (TC/TM) systems, to mention only a few), which in turn causes high production costs. Another very important consideration is the fact that the processing power of the previously used processors cannot be expanded. Furthermore, not only do such prior art systems have high power losses and a high overall weight, they also necessitate high expenditures for very different types of testing and checking systems for the AOC's, the check-out systems in the satellite, and the systems for carrying out dynamic tests with real or simulated sensors and actuators, etc.

It is therefore an object of the present invention to provide an AOCS of the initially mentioned type which ensures a significant reduction of weight and power losses, an increase of safety and reliability, a reduction of component multiplicity and enhanced flexibility.

Another object is to provide a corresponding testing system which ensures the highest possible standardization and universality (while including an existing IV network structure), with minimal expenditures.

These and other objects and advantages are achieved according to the present invention, in which a standard interface is created between the AOCE and all peripherals, and between the AOCE and the TC/TM system. This function-related point-to-point communication, ensures that there will be no limitation of the communication bandwidth, as can happen, for example, in the case of the communication by way of a bus. Also, limitation of processing capacity is avoided by using microprocessors with expandable processing powers (expandable microprocessor, or µP/exp), such as transputers. Furthermore, it is also advantageous to decentralize the processing capability and to ensure a data processing on site (that is, in the periphery). In addition, all functions, such as automatic controllers, modulators, etc. are implements in µP/exp's.

Another important advantage of the invention is that all phases of the AOCE and the AOCS can be tested, and with the including of sensors and actuators, by means of standard testing equipment. The testing system is conceived as an integral component on the IV-network.

Other objects, advantages and novel features of the present invention will become apparent from the following detailed description of the invention when considered in conjunction with the accompanying drawings.

DETAILED DESCRIPTION OF THE DRAWINGS

An important feature of the invention lies in the use of an expandable microprocessor, which in this case is constructed as an RISC (Reduced Instruction Set Computer) with a hardware based operating system core. Data processing takes place in a CPU (Central Processing Unit), with data transfer by DMA (Direct Memory Access). An important feature of this arrangement is that the communication between the µP/exp's takes place by a serial point-to-point connection, also called a link, rather than by way of a bus, because such a bus has only a limited communication band-width, and its real-time capacity decreases with the rising number if intelligent users. Since every µP/exp has several links and its own random access memory (RAM), the processing and communication capacity of the system is almost unlimited. The power of the AOCS may therefore be expanded at any time.

The standard interfaces are functionally linked so that no bus is required, and all data are transmitted serially by means of a standard protocol. Furthermore, a separation of the potentials of the data lines is provide, so that there need be no separation of the potentials of the supply—as previously required. As a result, high-expenditure converters may be replaced by simple controllers, which reduces expenditures and maximizes reliability while, at the same time, electromagnetic interference problems are virtually eliminated.

The above-described AOC-system, including all sensors and all actuating members can be tested completely and without limit, even at the launching pad itself. Data processing on site has been discussed; also the inclusion of the testing facilities and test pieces in the IV-network.

Processing power and reliability are the principal factors in the internal structure of an AOCS, and AOCE or the peripheral. By means of µP/exp's, which after all have several links, arbitrary topologies can be implemented, which are known and do not have to be mentioned.

Figure 1:
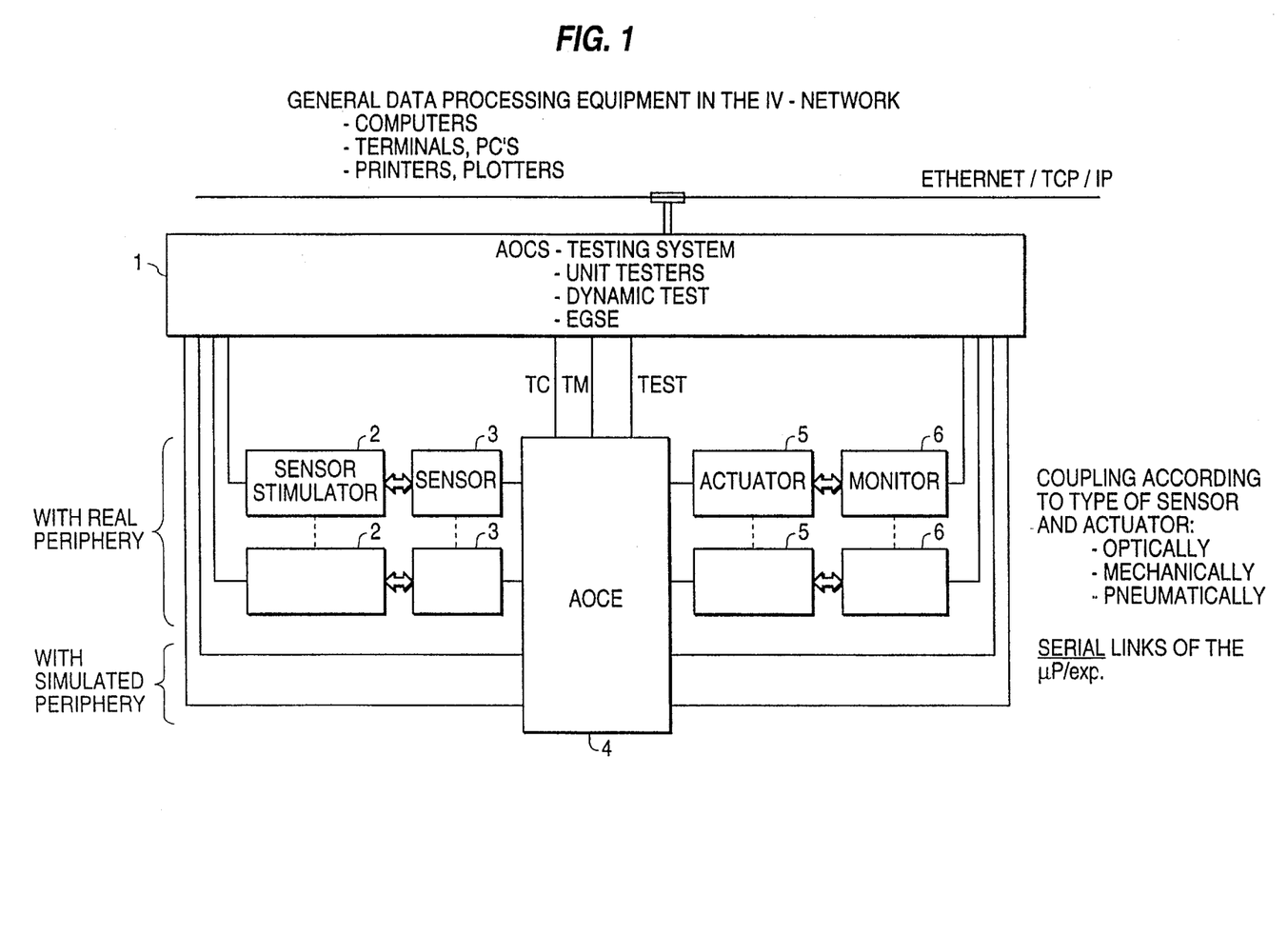
FIG. 1 is a block diagram of an embodiment of an AOCS according to the invention, with an associated test system.

Referring now to FIG. 1 of the drawing, there is illustrated an embodiment of an AOCS, together with associated testing system, according to the invention. This arrangement has all capabilities which are required for various tests; that is, for testing the AOCE (unit tester), for dynamic bench tests, as a component of the EGSE (Electrical Ground Support Equipment), for simulation of satellite behavior as well as for training operators. It utilizes all available elements existing in the IV-network, such as computers, printers/plotters, terminals, disk storage, etc.

Element 1 in FIG. 1 is a conventional multiplexer (a multiprocessor system with a real-time behavior) which, on the one hand, is coupled to the Ethernet and, on the other hand, services several standard interfaces. The standard inputs/outputs may be connected with one another by way of filter functions. (This element is described in greater detail in FIG. 6.) The sensor stimulator 2 receives status signals, position signals and acceleration values from the AOCS testing system and converts such signals into signals which a sensor requires as an input, such as sun light, infrared image of the earth, cage adjustment of the gyros, etc. Sensors 3, which receive the real physical input quantities (light, acceleration, etc.) from the sensor stimulators have a standard interface to the AOCE, and transform the physical quantities into electric signals. Sensors suitable for this purpose are commercially available, for example, from Deutsche Aerospace, Galilei, Northrop and MATRA.

The AOCE unit 4 detects the signals (status, position, acceleration, etc.) generated by the sensors, processes these data by way of filters, generates corresponding actuating variables quantities in the form of electric signals, and stimulates the actuators. The AOCE 4 is monitored and controlled by way of the TC/TM system. (Additional internal quantities may be checked by way of a testing channel also in the standard interface.) AOCE's of this type are well known, being utilized on numerous satellite systems, including SYMPHONY, INTELSAT, TV-SAT, DFS, TELE-X, EURECA, SPAS and EUTELSAT.

By way of the standard interface, the actuators 5 convert the electric signals coming from the AOCE into the physical actuating variables which cause the unified propulsion system to generate jet signals with hot or cold gas. A spin wheel and the wheel drive electronics unit generate torques. The monitors 6 detect the physical signals originating from the actuators and tap the corresponding signals in an electric form at the end of the function chain. The signals are processed in the monitor and are supplied to the AOCS system by way of the standard interface.

Figure 2:
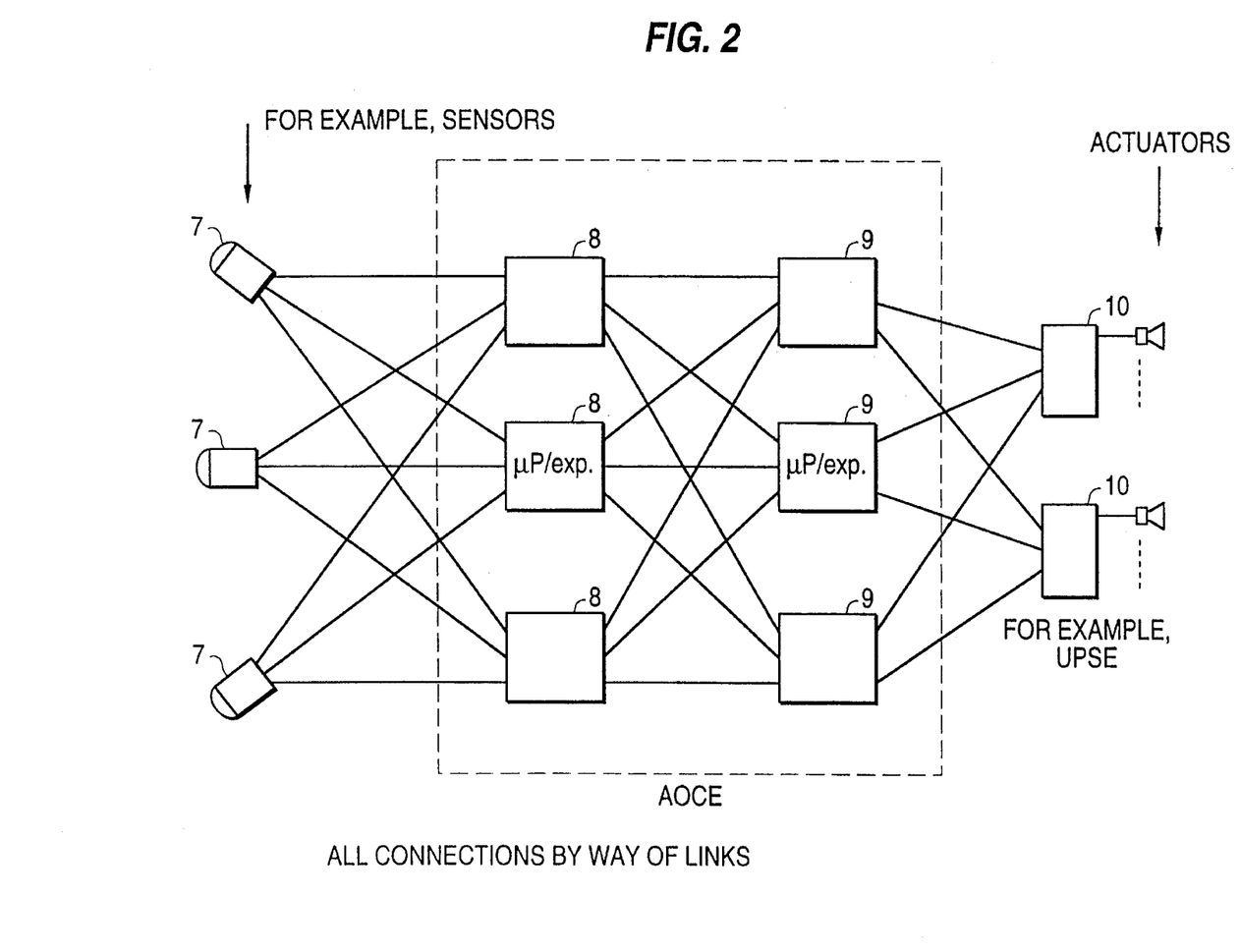
FIG. 2 is a schematic view of an AOCE having double hot redundancy.

As shown in FIG. 2, the reliability of the system can be increased considerably by means of double hot redundancy. However, normal software faults, which exist in all utilities, cannot be eliminated. In the illustrated structure, the software may be operated in a truly redundant manner, that is, in an independently programmed manner. Since, in the input process of a µP/exp, external process are automatically synchronized by the link protocols, the majority decision may also be carried out in this case. Also, in addition to plausibility checks, connections may also be established in the sensors which are arranged in a geometrically different manner.

FIG. 2 illustrates the overall function chain of the AOCS. The sensor 7 and the function groups are designed in the AOCE in majority (triple) redundancy; and the actuators 10 are designed in simple passive redundancy. All connections are designed correspondingly by way of the standard interface.

Each function node in the AOCE is represented by a conventional µP/exp 8 which receives signals from each of the sensors and carries out a majority decision. Each µP/exp 8 has controller functions and supplies its output quantities to another µP/exp 9 situated downstream in the function chain, which also performs a majority decision. Each µP/exp 9 has modulator functions and supplies its output quantities to the actuators 10.

Figure 3:
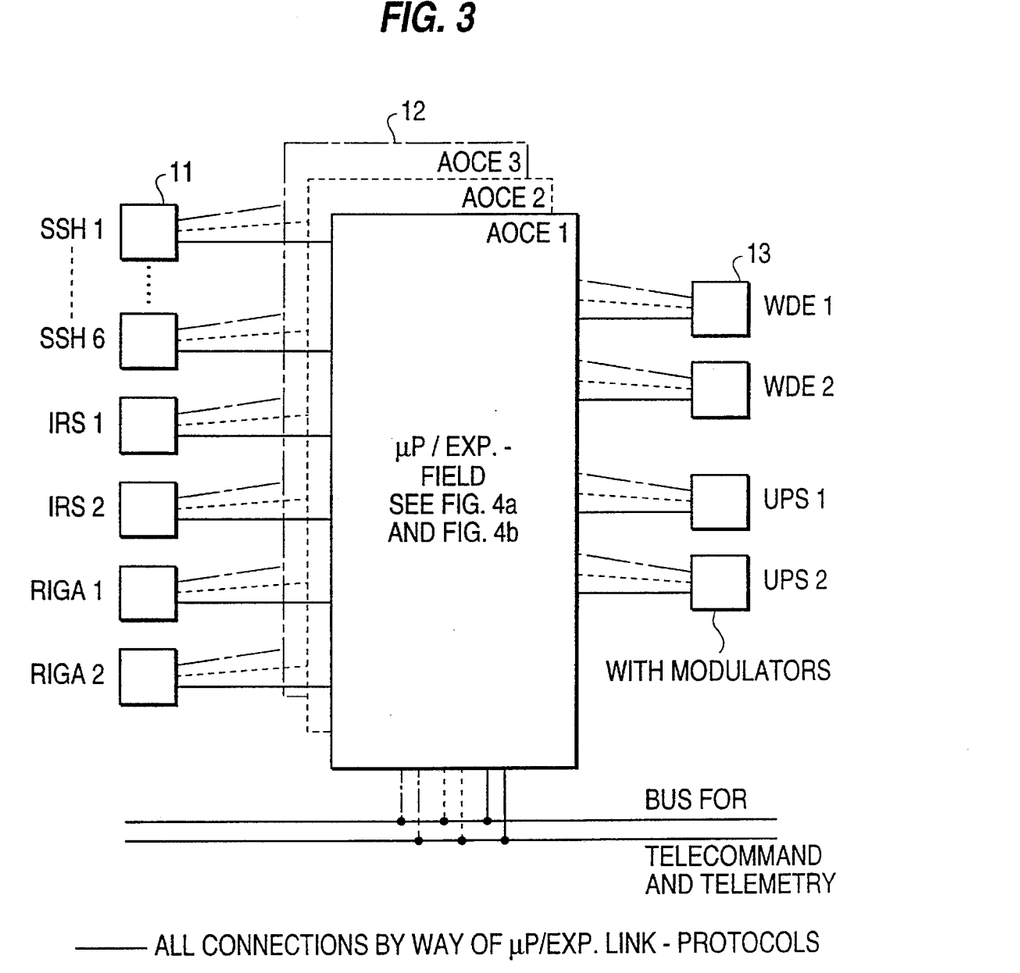
FIG. 3 is a view of an AOCE structure with one to three AOCE's.

FIG. 3 shows an AOCS-structure, which achieves enhanced reliability by adding a redundant or double redundant AOCE. As mentioned previously, the connections take place by way of a standard interface. Majority decisions are not carried out in an AOCE but are shifted into the actuators.

Figure 4A:
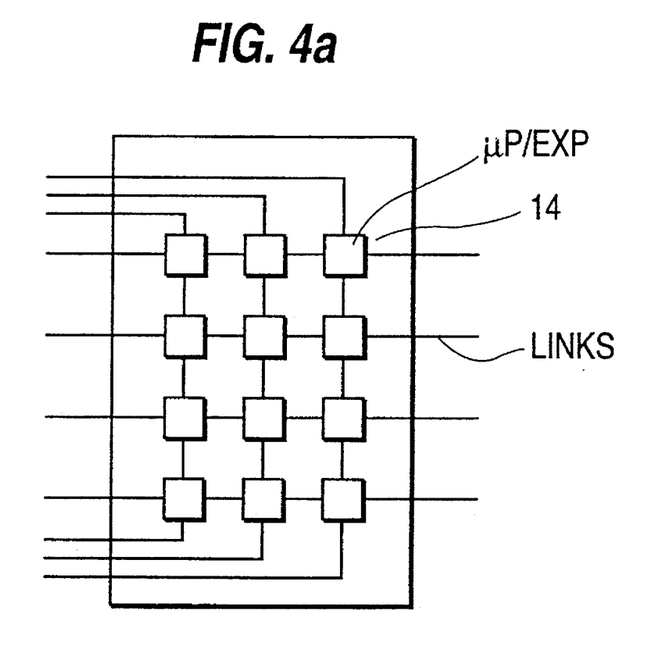
FIG. 4a is a view of an AOCE with microprocessors having expandable process capabilities, and a link multiplexer.
Figure 4B:
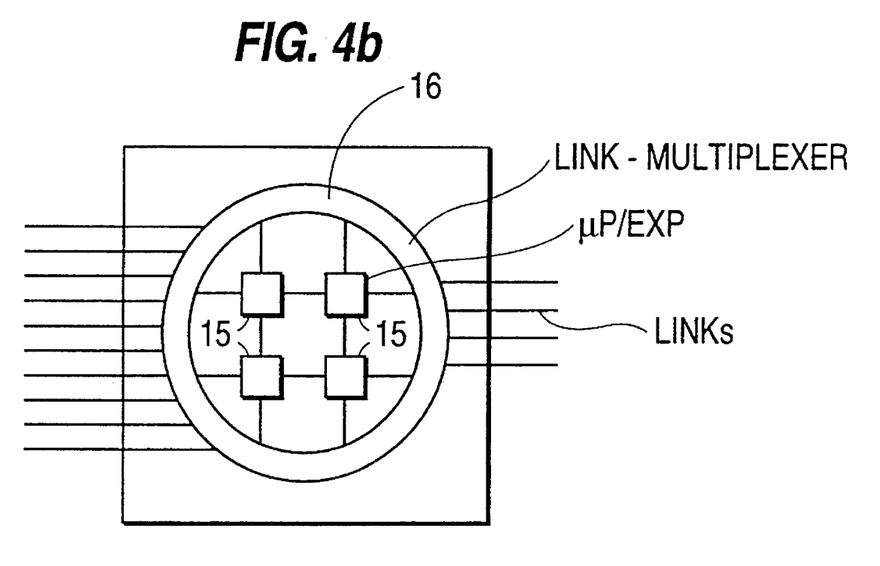
FIG. 4b is a view of an AOCE with microprocessors having expandable processing capabilities and a link multiplexer.

The AOCE is connected with each sensor 11 and each actuator 13 in each case only by means of a standard interface. (Each AOCE has an internal structure, as indicated in FIG. 4a and 4b.) The AOCE provides input signals to the actuators 13, where the majority decision is made. The function of a modulator can be implemented in the AOCE as well as in the actuator.

FIG. 4a represents an AOCE, such as is used in FIG. 3. The internal structure consists of a matrix or µP/exp's 14, whereby the functions of a failed node may be shifted into another node. (In this case, a µP/exp basically consists only of a processor component with the corresponding RAM and PROM expansions.)

FIG. 4b represents another embodiment of an AOCE, such as is used in FIG. 3, in which the internal structure consists of a link multiplexer 16 connected externally to each of the sensors and actuators by way of standard interfaces. Internally, it is connected with a smaller number of µP/exp's 15 than is required in the case of 4a. Each external link can be connected by way of the link multiplexer with each internal µP/exp 15, which consists of a processor component with the corresponding RAM and PROM expansions.

Figure 5:
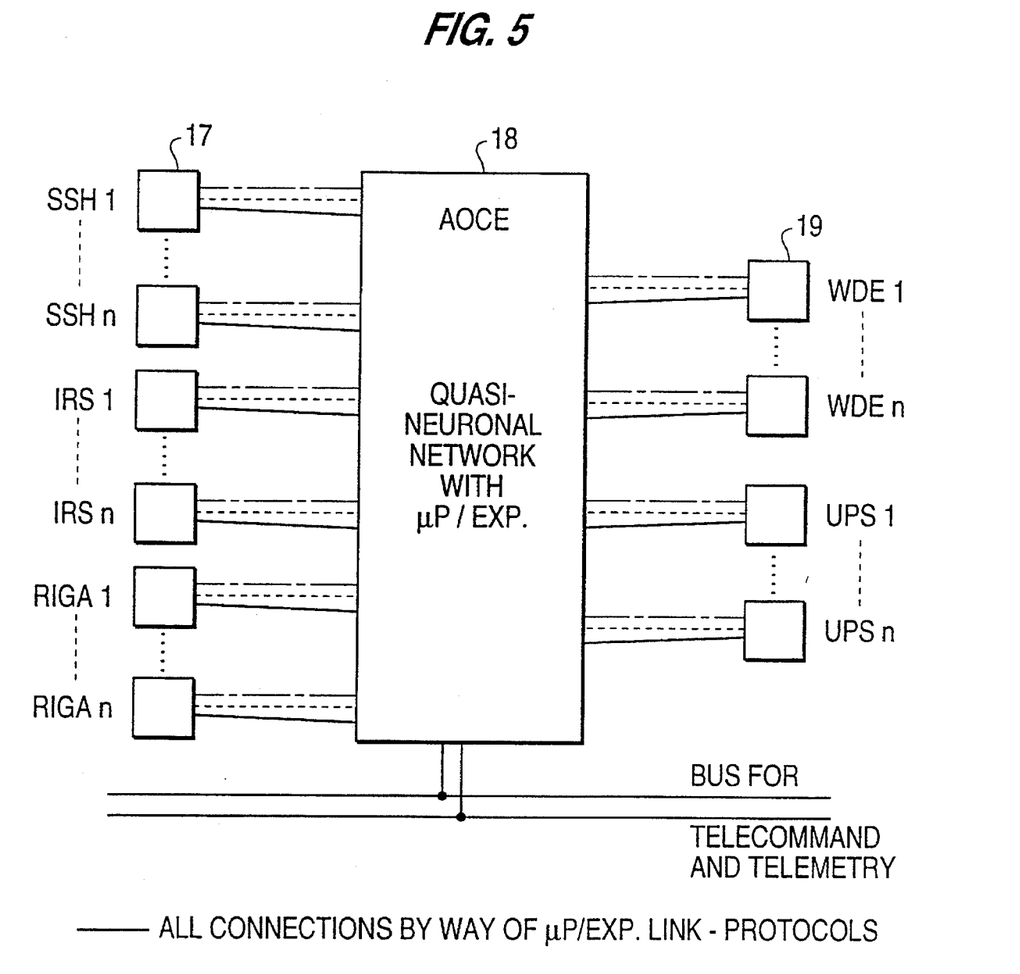
FIG. 5 is an AOCE with a quasi neuronal network.

A high reliability AOCS may be achieved in the manner shown in FIG. 5, in which the AOCE is designed for example, with a quasi neuronal network of µ/exp's. In this embodiment, tasks need no longer remain locally fixed, and a multiple hot-redundant operation may be achieved. Moreover, in the event of a failure of individual cells, an arbitrary reconfiguration of the task distribution can take place without even a short-term losses of function.

FIG. 5 depicts a complete AOCS, but with a redundancy principle by means of which the highest reliability can be achieved. Each sensor and each actuator is multiply connected with the AOCE, as before, by way of standard interfaces. Majority decisions are made in the actuators as well as in the AOCE, which as noted previously contains a quasi-neuronal network of µP/exp's. Internal linking is provided by way of link multiplexers, and is so extensive that even multiple failures of individual nodes cannot result.

Figure 6:
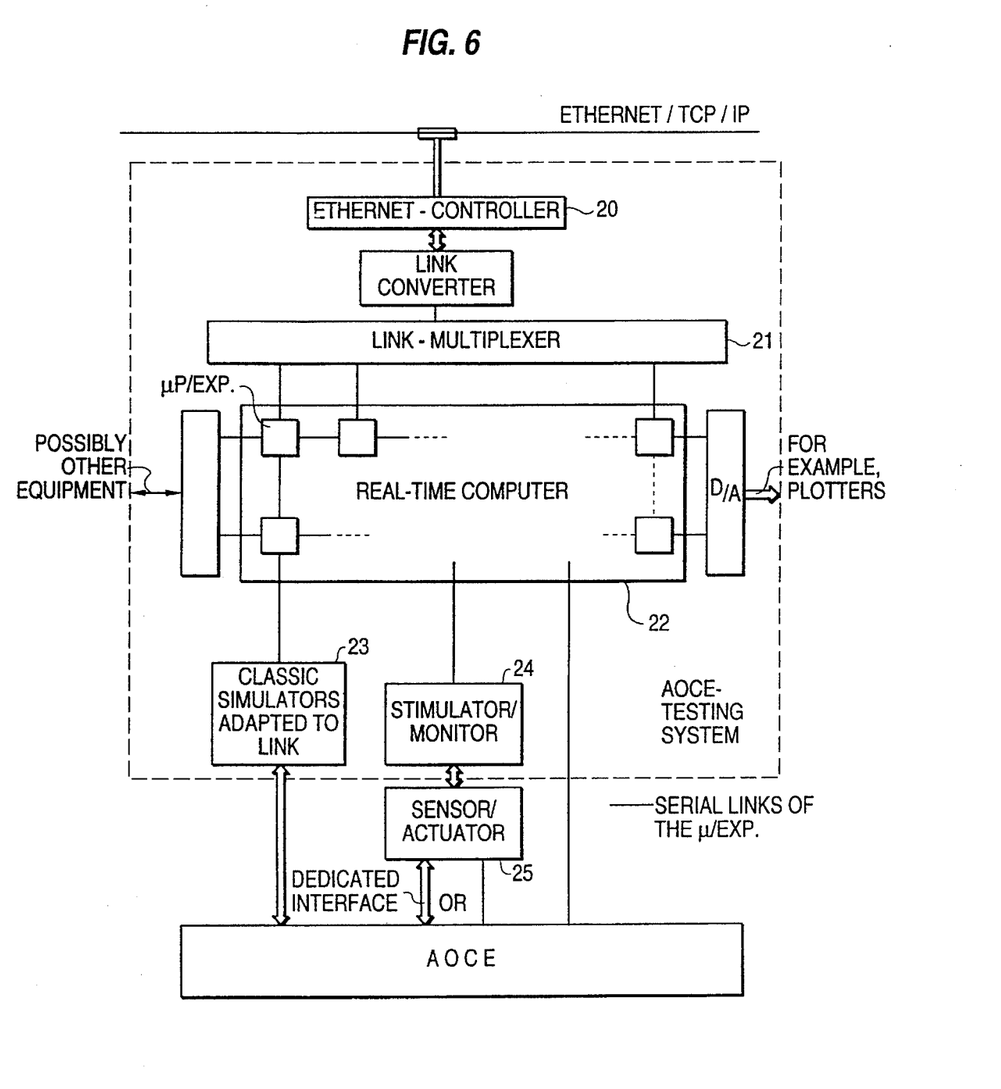
FIG. 6 is a schematic block diagram with an AOCE testing system.

FIG. 6 shows a block diagram of an AOC system according to the invention with an integrated testing system which can be used for any testing purpose by all utilities connected to the IV-network; including as a unit tester, for dynamic tests, as a simulator and as EGSE. The real-time computer 22 is a µP/exp network which is loaded by way of the IV-network with the test-specific programs. Necessary general data processing-operations such as interactive control, sequence control, filing, data input and output, test documentation and similar operations, are carried out in a corresponding device, such as a host computer with an operation system such as sold under the trademark UNIX. The real-time computer is also provided with digital to analog converters to accommodate connection of analog plotters, etc. Connection of test pieces is performed exclusively by way of μP/exp links, so that communication with the test piece is defined essentially by the protocols. The real-time computer may, for example, be equipped with universal software tools which permit the simulation of the control path in the case of dynamic tests.

The Ethernet controller 20 in FIG. 6 converts Ethernet information to a standard interface and vice versa. (Such a controller is commercially available, for example, from SGS-THOMSON.) The link multiplexer 21 (again, available from SGS-THOMSON) distributes the Ethernet-side information to several standard interfaces and vice versa. The real-time computer 22 (commercially available, for example, from SGS-THOMSON) represents the link between the AOCE and the link multiplexer. It can be configured arbitrarily and may connect the AOCE interfaces with one another by way of filters, etc., and thus close control loops. The actual control quantities are supplied by way of the Ethernet and the results are transferred there. Data may also be supplied directly to recording devices, such as plotters. The real-time computer communicates with the AOCE either by way of simulators, stimulator/monitors in connection with the sensors actuators, or directly by way of standard interfaces.

Interface simulators 23 for different AOCE interfaces may adapted to standard interfaces (to the real-time computer) if a dedicated interface is required between the AOCE and the sensor or actuator. (This is relevant for pure AOCE tests.)

The use of the μP/exp in the AOC system according to the invention and its testing system significantly reduces or eliminates the interface units for the AOCE. This also applies to the plugs and the internal cabling and leads to a considerable reduction of types. This alone results in a significant increase of the reliability.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A spacecraft attitude and orbit control system comprising:

a plurality of peripheral systems;

an attitude and orbit control electronics unit which controls such peripheral systems, and which comprises a multiplicity of expandable microprocessors which have a uniform configuration, a plurality of connection links, and expandable processing capabilities; and a uniform standard interface between the attitude and orbit control electronics unit and said peripheral systems, and between the attitude and orbit control electronics unit and a telecommand/telemetry system of said spacecraft;

each of said peripheral systems, being coupled to at least one expandable microprocessor in said attitude and orbit control electronics unit, by a separate direct point-to-point connection; and expandable microprocessors coupled to said peripheral systems being coupled to each other by respective separate serial point-to-point connection links, whereby separation of potentials of communication links is achieved;

whereby a multiplicity of peripheral systems in a first group of said peripheral systems is coupled in communication with a multiplicity of peripheral systems in a second group of said peripheral systems, by means of busless point-to-point connection of said expandable microcomputers.

2. Spacecraft attitude and orbit control system according to claim 1, further comprising:

a fixed potential supply connected to the attitude and orbit control electronics unit and to the peripheral systems by means of transformerless 2-point controllers; and a standard testing system coupled to all phases of the attitude and orbit control electronics unit, as well as to the attitude and orbit control system as a whole, for simulating, testing and training purposes.

3. A system according to claim 2, wherein the standard testing system is an integral component of a network system which is of one of: an ethernet and an IV-net, general data processing equipment being components of the system for the testing purpose.

4. A system according to claim 3, wherein the attitude and orbit control electronics unit has decentralized processing and data processing on site.

5. Spacecraft attitude and orbit control system according to claim 2, wherein said first group of peripheral systems comprises a plurality of sensor elements for sensing physical parameters of said spacecraft, and said second group of peripheral systems comprises a plurality of actuators for controlling operation of said spacecraft.

6. Spacecraft attitude and orbit control system according to claim 5, wherein said testing system comprises:

a plurality of sensors stimulators coupled to transmit physical stimuli to said sensor elements;

a plurality of monitor elements coupled to said actuators, for detecting physical outputs thereof and generating corresponding electric signals; and a multiplexer processor for controlling operation of said sensor stimulators, sensors, actuators and monitor elements, as well as an attitude and orbit control electronics unit for processing information from said sensors and generating control signals for said actuators.

7. A system according to claim 1, wherein each expandable microprocessor has its own program memory and data memory.

8. A system according to claim 7, wherein each expandable microprocessor carries out data processing by way of a central processing unit, and separately from it the data transfer by way of direct memory access, without any load on the central processing unit.

9. A system according to claim 1, wherein said attitude and orbit control system has a multiple redundant design, whereby no function losses occur in the case of failures, and no operational stoppage is required for reconfiguration.

10. A system according to claim 1, wherein the attitude and orbit control electronics unit has decentralized processing and data processing on site.

11. A system according to claim 10, wherein each expandable microprocessor has its own program memory and data memory.

12. A system according to claim 1, wherein each expandable microprocessor carries out data processing by way of a central processing unit, and separately from it the data transfer by way of direct memory access, without any load on the central processing unit.

13. A system according to claim 12, wherein said attitude and orbit control system has a multiple redundant design, whereby no function losses occur in the case of failures, and no operational stoppage is required for reconfiguration.

14. A spacecraft attitude and orbit control system comprising:

at least first and second groups of peripheral systems;

an attitude and orbit control electronics unit which communicates with said at least first and second groups of peripheral systems;

a uniform standard interface between said attitude and orbit control electronics unit and said peripheral systems, and between said attitude and orbit control electronics unit and a telecommand/telemetry system of said spacecraft;

said attitude and orbit control electronics unit comprising at least first and second groups of microprocessors associated with said respective at least first and second groups of peripheral systems;

each of said peripheral systems of said first group of peripheral systems being coupled with at least one of said microprocessors of said first group of microprocessors, by means of a separate direct point-to-point connection;

each of said peripheral systems of said second group of peripheral systems being coupled with at least one of said microprocessors of said second group of microprocessors, by means of a separate direct point-to-point connection; and each of said microprocessors of said first group of microprocessors being coupled to a plurality of said microprocessors of said second group of microprocessors by means of a separate point-to-point connection, whereby said attitude and orbit control system communicates with said first and second groups of peripheral systems by means of busless point-to-point connection of said microprocessors.

15. Spacecraft attitude and orbit control system according to claim 14, further comprising:

a fixed potential supply connected to the attitude and orbit control electronics unit and to the peripheral systems by means of transformerless 2-point controllers; and a standard testing system coupled to all phases of the attitude and orbit control electronics unit, as well as to the attitude and orbit control system as a whole, for simulating, testing and training purposes.

* * * * *